United States Patent
Hou et al.

(10) Patent No.: US 9,060,098 B2
(45) Date of Patent: Jun. 16, 2015

(54) METHOD AND SYSTEM FOR DATA PROCESSING IN A DEVICE WITH INTEGRATED SET-TOP-BOX AND FEMTOCELL FUNCTIONALITY

(75) Inventors: Victor T. Hou, La Jolla, CA (US); Xuemin Sherman Chen, San Diego, CA (US); Charles Abraham, Los Gatos, CA (US); Wael William Diab, San Francisco, CA (US); Vinko Erceg, Cardiff, CA (US); Jeyhan Karaoguz, Irvine, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 580 days.

(21) Appl. No.: 12/355,377

(22) Filed: Jan. 16, 2009

(65) Prior Publication Data

US 2010/0186027 A1 Jul. 22, 2010

(51) Int. Cl.
*H04N 7/20* (2006.01)
*H04N 7/18* (2006.01)
(Continued)

(52) U.S. Cl.
CPC ........... *H04N 7/173* (2013.01); *H04N 21/2143* (2013.01); *H04N 21/4307* (2013.01);
(Continued)

(58) Field of Classification Search
CPC .............. H04N 7/173; H04N 21/2143; H04N 21/4307; H04N 21/43615; H04N 21/43637; H04N 21/4381; H04N 21/4402
USPC ............... 725/62, 68, 85, 100, 110, 131, 139, 725/151, 80, 81; 455/422.1; 348/63, 67, 68, 348/81
See application file for complete search history.

(56) References Cited

U.S. PATENT DOCUMENTS

2005/0144647 A1* 6/2005 Zussman et al. ............... 725/106
2006/0053457 A1* 3/2006 Guenebaud ................... 725/100
(Continued)

FOREIGN PATENT DOCUMENTS

EP 1786222 A1 2/2007
EP 1775935 A2 4/2007
(Continued)

OTHER PUBLICATIONS

European Search Report, EP Application No. 1000180.9-2223, Munich, Apr. 7, 2010, pp. 1-5.
(Continued)

*Primary Examiner* — Pankaj Kumar
*Assistant Examiner* — Alazar Tilahun
(74) *Attorney, Agent, or Firm* — Sterne, Kessler, Goldstein & Fox PLLC

(57) ABSTRACT

Aspects of a method and system for data processing in a device with integrated set-top-box and femtocell functionality are provided. Data may be received via an integrated femtocell and set-top-box device and may be synchronously processed, utilizing a common clock, to perform one or more femtocell functions and/or set-top-box functions. The common clock may be derived from global navigation satellite system signals. The integrated femtocell and set-top-box device may convert the received data from a first to a second format. The converted data may be transmitted to a cellular enabled communication device via a cellular transmitter within said integrated femtocell and set-top-box device and/or to a multimedia device via a multimedia interface within said integrated femtocell and set-top-box device. The received data may comprise multimedia content. The integrated femtocell and set-top-box device may be operable to encode, decode, transcode, encrypt, decrypt, scramble, descramble, and present the received multimedia content.

25 Claims, 4 Drawing Sheets

(51) Int. Cl.

| | | |
|---|---|---|
| *H04N 7/173* | (2011.01) | |
| *H04N 7/16* | (2011.01) | |
| *H04N 21/214* | (2011.01) | |
| *H04N 21/43* | (2011.01) | |
| *H04N 21/436* | (2011.01) | |
| *H04N 21/4363* | (2011.01) | |
| *H04N 21/438* | (2011.01) | |
| *H04N 21/4402* | (2011.01) | |
| *H04N 21/8547* | (2011.01) | |
| *H04W 84/04* | (2009.01) | |
| *H04W 88/10* | (2009.01) | |

(52) U.S. Cl.
CPC ... *H04N21/43615* (2013.01); *H04N 21/43637* (2013.01); *H04N 21/4381* (2013.01); *H04N 21/4402* (2013.01); *H04N 21/440218* (2013.01); *H04N 21/8547* (2013.01); *H04W 84/045* (2013.01); *H04W 88/10* (2013.01)
USPC .......... 725/81; 725/68; 725/85; 725/100; 725/110; 725/131; 725/139; 725/151; 725/62; 725/80; 455/422.1

(56) References Cited

U.S. PATENT DOCUMENTS

| | | | |
|---|---|---|---|
| 2006/0209795 A1 | 9/2006 | Chow et al. | |
| 2007/0121655 A1 | 5/2007 | Jin | |
| 2008/0216145 A1 | 9/2008 | Barton et al. | |
| 2008/0244148 A1* | 10/2008 | Nix et al. | 710/313 |
| 2009/0042536 A1 | 2/2009 | Bernard et al. | |
| 2009/0061873 A1 | 3/2009 | Bao et al. | |
| 2009/0092081 A1 | 4/2009 | Balasubramanian et al. | |
| 2009/0098858 A1 | 4/2009 | Gogic | |
| 2009/0164547 A1 | 6/2009 | Ch'ng | |
| 2009/0279430 A1 | 11/2009 | Huber et al. | |
| 2009/0288144 A1 | 11/2009 | Huber et al. | |
| 2009/0292799 A1 | 11/2009 | Eisener et al. | |
| 2009/0316649 A1 | 12/2009 | Chen | |
| 2010/0041364 A1* | 2/2010 | Lott et al. | 455/404.1 |
| 2010/0144341 A1* | 6/2010 | Robbins et al. | 455/426.1 |
| 2010/0167734 A1 | 7/2010 | Jones et al. | |
| 2010/0182991 A1 | 7/2010 | Abraham et al. | |
| 2010/0184411 A1 | 7/2010 | Chen et al. | |
| 2010/0184414 A1 | 7/2010 | Abraham et al. | |
| 2010/0184423 A1 | 7/2010 | Kent et al. | |
| 2010/0184450 A1 | 7/2010 | Chen et al. | |
| 2010/0210239 A1 | 8/2010 | Karaoguz et al. | |
| 2010/0220642 A1 | 9/2010 | Abraham et al. | |
| 2010/0220692 A1 | 9/2010 | Diab et al. | |
| 2010/0220731 A1 | 9/2010 | Diab et al. | |
| 2010/0222054 A1 | 9/2010 | Abraham et al. | |
| 2010/0222069 A1 | 9/2010 | Abraham et al. | |
| 2010/0238836 A1 | 9/2010 | Diab et al. | |
| 2011/0263269 A1* | 10/2011 | Do et al. | 455/456.1 |

FOREIGN PATENT DOCUMENTS

| | | |
|---|---|---|
| GB | 2381158 A | 4/2003 |
| WO | WO2005021022 | 3/2005 |
| WO | WO 2005/051022 | 6/2005 |
| WO | 2007/000455 | 1/2007 |

OTHER PUBLICATIONS

Dimitri Rubin and Todd Young, "Fennotcells Bringing Reliable Location and Timing Indoors," InsideGNSS, vol. 3, No. 7, Oct. 29, 2008, pp. 40-45, XP002576476.
picoChip flexible wireless, "The Case for Home Basestations," Technical White Paper, Sep. 30, 2008, pp. 1-22, XP002576477, Bath, United Kingdom.
Unpublished U.S. Appl. No. 12/391,009, filed Feb. 23, 2009.
Unpublished U.S. Appl. No. 12/395,470, filed Feb. 27, 2009.
Unpublished U.S. Appl. No. 12/395,410, filed Feb. 27, 2009.
Unpublished U.S. Appl. No. 12/395,383, filed Feb. 27, 2009.
Unpublished U.S. Appl. No. 12/395,313, filed Feb. 27, 2009.
Unpublished U.S. Appl. No. 12/395,436, filed Feb. 27, 2009.
Unpublished U.S. Appl. No. 12/406,835, filed Mar. 18, 2009.
European Search Report corresponding to European Patent Application No. 10001341.6-1244, dated Jul. 5, 2010.

* cited by examiner

METHOD AND SYSTEM FOR DATA PROCESSING IN A DEVICE WITH INTEGRATED SET-TOP-BOX AND FEMTOCELL FUNCTIONALITY

CROSS-REFERENCE TO RELATED APPLICATIONS/INCORPORATION BY REFERENCE

Not Applicable

FIELD OF THE INVENTION

Certain embodiments of the invention relate to communications. More specifically, certain embodiments of the invention relate to a method and system for data processing in a device with integrated set-top-box and femtocell functionality.

BACKGROUND OF THE INVENTION

A femtocell may be placed in a customer's residence or in a small business environment, for example. Femtocells may be utilized for off-loading macro radio network facilities, improving coverage locally in a cost-effective manner, and/or implementing home-zone services to increase revenue. Femtocells, like macro base stations, may be enabled to connect "standard" phones to a cellular provider's network by a physical broadband connection which may be a digital subscriber line (DSL) connection and/or a cable connection, for example. Since the traffic between a customer's premises femtocell equipment and the operator's network may be traversing a public network, the traffic may be prone to various risks.

Communication between femtocells and one or more cellular provider's networks enables operation in private and public areas. The capacity of a femtocell may be adequate to address a typical family use model supporting two to four simultaneous voice calls and/or data, for example.

An important characteristic of femtocells is their ability to control access. In an open access scenario, any terminal and/or subscriber may be allowed to communicate with the femtocell. Accordingly, the femtocell usage may somewhat resemble that of a macrocellular system. In a closed access scenario, the femtocell may serve a limited number of terminals and/or subscribers that may be subscribed to a given cellular base station. In this regard, the cellular base station may be perceived as being deployed for private usage.

A regulatory issue with regard to femtocells is that they use licensed frequencies that radiate at a very low power in a controlled environment. It may be likely that they may not require a license from a local authority, as macrocellular base stations do. An additional regulatory issue may arise from the relationship between a femtocell operator and a broadband services operator. One possible scenario may include the broadband operator being unaware of the existence of a femtocell operator. Conversely, the broadband operator and femtocell operator may have an agreement or they may be the same operator, for example. Interference between femtocells may be an issue for femtocell deployments based on wideband technologies such as WCDMA, for example, because initial operator deployments may use the same frequency for both the femtocell and the macrocellular networks or due to the proximity of femtocell base stations in dense urban areas.

There are a plurality of design models for deployment and integration of femtocells, for example, an IP based Iu-b interface, a session initiation protocol (SIP) based approach using an Iu/A interface, use of unlicensed spectrum in a technique known as unlicensed mobile access (UMA) and/or use of IP multimedia subsystem (IMS) voice call continuity (VCC), for example.

In an Iu-b model based femtocell deployment approach, femtocells may be fully integrated into the wireless carrier's network and may be treated like any other remote node in a network. The Iu-b protocol may have a plurality of responsibilities, such as the management of common channels, common resources, and radio links along with configuration management, including cell configuration management, measurement handling and control, time division duplex (TDD) synchronization, and/or error reporting, for example. In Iu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for data processing in a device with integrated set-top-box and femtocell functionality, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for data processing in a device with integrated set-top-box and femtocell functionality. In various embodiments of the invention, data may be received via an integrated femtocell and set-top-box device and may be synchronously processed, utilizing a common clock, to perform one or more femtocell functions and/or set-top-box functions. A portion of the femtocell functions may be implemented via a cellular transmitter and/or receiver within the integrated femtocell and set-top-box device. A portion of the set-top-box functions may be implemented via a broadband transmitter and/or receiver within the integrated femtocell and set-top-box device. A portion of the set-top-box functions may be implemented via one or more multimedia interfaces within the integrated femtocell and set-top-box device. The common clock may be derived from global navigation satellite system signals. The integrated femtocell and set-top-box device may convert the received data from a first to a second format. The converted data may be transmitted to a cellular enabled communication device via one or more cellular communication channels and/or to one or more multimedia devices via one or more multimedia connections. The received data may comprise multimedia content. The integrated femtocell and set-top-box device may be operable to encode, decode, transcode, encrypt, decrypt, scramble, descramble, and present the received data. The integrated femtocell and set-top-box device may be operable to receive the data via a cellular communication channel, transcode the data, and transmit the transcoded data via a multimedia connection. The integrated femtocell and set-top-box device may be operable to receive the data via a broadband connection to a broadband network, transcode the data, and transmit the transcoded data via a cellular communication channel.

Figure 1A:
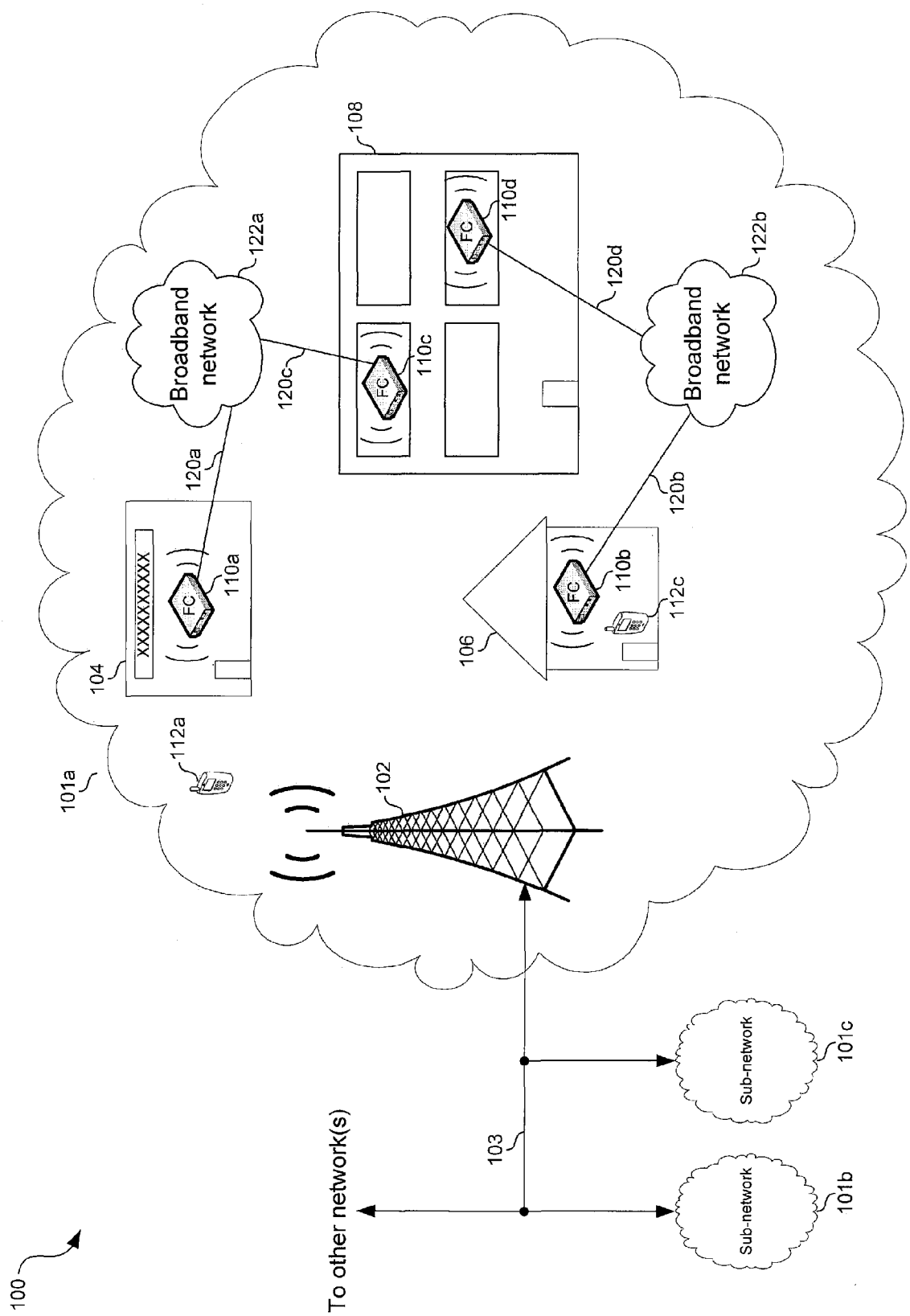
FIG. 1A is a diagram illustrating an exemplary cellular network, in accordance with an embodiment of the invention.

FIG. 1A is a diagram illustrating an exemplary cellular network, in accordance with an embodiment of the invention. Referring to FIG. 1A, there is shown a cellular network 100 comprising sub-networks 101a-101c. The exemplary sub-network 101a may comprise a base station 102, integrated femtocell and set-top-box (IFSTB) devices 110a-110d, which are collectively referred to herein as IFSTB devices 110, and cellular enabled communication devices 112a and 112c, which are collectively referred to herein as cellular enabled communication devices 112. The IFSTB devices 110 may be installed in one or more commercial properties 104, one or more residential properties 106, and/or one or more multi-tenant properties 108.

The networks 122a and 122b, collectively referred to herein as networks 122, may comprise, for example, satellite networks, cable networks, DVB networks, the Internet, or similar local or wide area networks, which are capable of conveying data which may comprise multimedia. The broadband connections 120a-120d, collectively referred to herein as connections 120, may comprise optical, wired, and/or wireless links.

The commercial properties 104 may comprise, for example, stores, restaurants, offices, and municipal buildings. The residential properties 106 may comprise, for example, single-family homes, home offices, and/or town-houses. Multi-tenant properties 108 may comprise, for example, residential and/or commercial tenants such as apartments, condos, hotels, and/or high rises. One or more of the commercial properties 104, residential properties 106, and/or multi-tenant properties 108 may comprise computing and/or multimedia networks which may comprise a set-top-box with integrated femtocell functionality.

The base station 102 may be operable to communicate data wirelessly utilizing one or more cellular standards such as IS-95, CDMA, GSM, TDMA, GPRS, EDGE, UMTS/WCDMA, TD-SCDMA, HSDPA, extensions thereto, and/or variants thereof. "Data," as utilized herein, may refer to any analog and/or digital information including but not limited to voice, Internet data, and/or multimedia. Multimedia may comprise audio and/or visual content comprising, video, still images, animated images, and/or textual content. The base station 102 may communicate with cellular enabled communication devices such as the cellular enabled communication devices 112. Exemplary cellular standards supported by the base station 102 may be specified in the International Mobile Telecommunications-2000 (IMT-2000) standard and/or developed by the $3^{rd}$ generation partnership project (3GPP) and/or the $3^{rd}$ generation partnership project 2 (3GPP2). The base station 102 may communicate data amongst the various components of the sub-network 101a. Additionally, data communicated to and/or from the base station 102 may be communicated to sub-network 101b, sub-network 101c, and/or to one or more other networks (not shown) via one or more backhaul connections 103. In this manner, data communicated to and/or from the base station 102 may be communicated to and/or from, other portions of the network 100 and/or other networks. Exemplary networks with which data may be communicated may comprise public switched telephone networks (PSTN) and/or IP networks such as the Internet or an intranet.

The IFSTB devices 110 may be operable to perform one or more functions of a femtocell. In this regard, the IFSTB devices 110 each comprise suitable logic, circuitry, and/or code that may be operable to communicate wirelessly utilizing one or more cellular standards such as IS-95, CDMA, GSM, TDMA, GPRS, EDGE, UMTS/WCDMA, TD-SCDMA, HSDPA, extensions thereto, and/or variants thereof. In this regard, the IFSTB devices 110 may each communicate with cellular enabled communication devices such as the cellular enabled communication devices 112. Exemplary cellular standards supported by the IFSTB devices 110 may be specified in the International Mobile Telecommunications-2000 (IMT-2000) standard and/or developed by the $3^{rd}$ generation partnership project (3GPP) and/or the $3^{rd}$ generation partnership project 2 (3GPP2). Additionally, the IFSTB devices 110 may each comprise suitable logic, circuitry, and/or code that may be operable to communicate over a network 122.

The IFSTB devices 110 may be operable to perform one or more functions of a set-top-box. In this regard, the IFSTB devices 110 each comprise suitable logic, circuitry, and/or code that may be operable to transmit and/or receive data via a multimedia network such as a satellite television network, a cable television network, and/or a digital video broadcast (DVB) network. Additionally, the IFSTB devices 110, may each comprise suitable logic, circuitry, and/or code that may be operable to encrypt, decrypt, compress, decompress, encode, decode, transcode, present, scramble, descramble, or otherwise process multimedia content. In this regard, the IFSTB devices 110 may each be operable to output multimedia content to one or more multimedia devices such as monitors, speakers, and/or storage devices.

The cellular enabled communication devices 112 may each comprise suitable logic, circuitry, and/or code that may be operable to communicate utilizing one or more cellular standards. In this regard, the cellular enabled communication devices 112 may each be operable to transmit and/or receive data via the cellular network 100. Exemplary cellular enabled communication devices may comprise laptop computers, mobile phones, and personal media players. The cellular enabled communication devices 112 may be enabled to receive, process, and present multimedia content and may additionally be enabled run a web browser or other applications for providing Internet services to a user of the cellular enabled communication device communication device 112.

In operation, the cellular enabled communication devices 112 may gain access to the cellular network 100 and/or to other communication networks via cellular communications with the base station 102 and the IFSTB devices 110. In this regard, in instances that a reliable cellular connection may be established between the base station 102 and a cellular enabled communication device communication device 112, then data may be communicated between the cellular enabled communication device communication device 112 and the base station 102. Alternatively, in instances that a reliable cellular connection may be established between any of the IFSTB devices 110 and a cellular enabled communication device communication device 112, then data may be communicated between the cellular enabled communication device communication device 112 and those IFSTB devices 110. Accordingly, the IFSTB devices 110 may extend the cellular coverage area in the sub-network 101*a*. In particular, the IFSTB devices 110 may extend or improve cellular coverage indoors or locations out of range of a base-station. The IFSTB devices 110 may additionally comprise set-top-box functionality and may be operable to distribute services and/or content to one or more cellular enabled communication devices 112 and/or one or more other multimedia and/or computing devices (not shown in FIG. 1A). In this regard, the IFSTB devices 110 may be enabled to receive multimedia content from a multimedia source and deliver the content to cellular enabled communication device devices and/or other communication devices. In this regard, each of the IFSTB devices 110 may be communicatively coupled to one or more networks 122 via a broadband connection 120.

In various exemplary embodiments of the invention, an IFSTB device 110 may be operable to receive content via a cellular connection, transcode and/or process the content for presentation, and convey the content to a device such as a monitor and/or speakers via a multimedia connection such as HDMI. The IFSTB device 110 may be operable to receive content via a broadband connection to a network such as a cable television network, transcode and/or process the content for presentation, and convey the content to a device such as a monitor and/or speakers via a multimedia interface such as HDMI. The IFSTB device 110 may be operable to receive content via a broadband connection to a network such as a cable television network, transcode and/or process the content, and convey the content to a cellular enabled communication device device via one or more cellular communication channels.

Figure 1B:
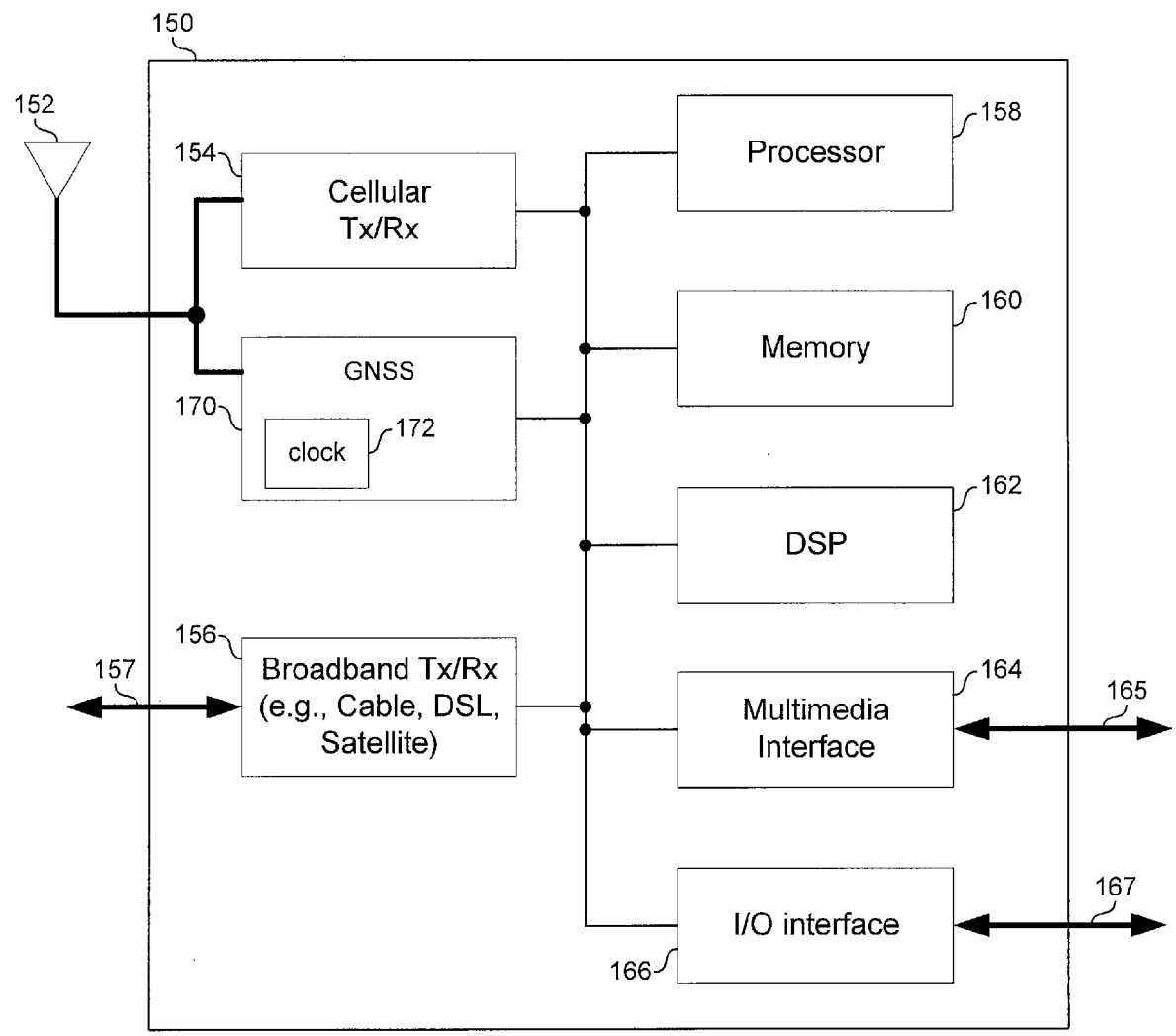
FIG. 1B is an exemplary block diagram of an integrated femtocell and set-top-box (IFSTB) device, in accordance with an embodiment of the invention.

FIG. 1B is an exemplary block diagram of an integrated femtocell and set-top-box (IFSTB) device, in accordance with an embodiment of the invention. Referring to FIG. 1B the IFSTB device 150 may comprise an antenna 152, a global navigation satellite system (GNSS) receiver (Rx) 170, a cellular transmitter and/or receiver (Tx/Rx) 154, a broadband transmitter and/or receiver (Tx/Rx) 156, a processor 158, a memory 160, a digital signal processor (DSP) 162, an multimedia interface 164, and an input and/or output (I/O) interface 166.

The antenna 152 may be suitable for transmitting and/or receiving cellular signals. Although a single antenna is illustrated, the invention is not so limited. In this regard, the cellular Tx/Rx 154 may utilize a common antenna for transmission and reception, may utilize different antennas for transmission and reception, and/or may utilize a plurality of antennas for transmission and/or reception. Similarly, the cellular Tx/Rx 154 and the GNSS Rx 170 may share an antenna or may utilize different antennas.

The GNSS Rx 170 may comprise suitable logic, circuitry, and/or code that may be operable to receive and process signals from a GNSS system. Exemplary GNSS systems comprise the United State's global positioning system (GPS), Russia's GLONASS, and the European Union's Galileo. The GNSS Rx 170 may comprise a clock 172 and may be operable to maintain the accuracy of the clock 172 based on received GNSS signals. In various embodiments of the invention, the clock 172 may be utilized to synchronize and/or maintain operations of other portions of the IFSTB device 150. For example, content may be transmitted, decoded and/or presented based on the clock 172.

The cellular Tx/Rx 154 may comprise suitable logic circuitry and/or code that may be operable to transmit and/or receive data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform amplification, up-conversion, filtering, modulation, and digital to analog conversion of transmitted cellular signals. Exemplary cellular standards supported by the IFSTB device 150 may be specified in the International Mobile Telecommunications-2000 (IMT-2000) standard and/or developed by the $3^{rd}$ generation partnership project (3GPP) and/or the $3^{rd}$ generation partnership project 2 (3GPP2).

The broadband Tx/Rx 156 may comprise suitable logic, circuitry, and/or code that may be operable to transmit data in adherence to one or more broadband standard. The broadband Tx/Rx 156 may be operable to perform amplification, down-conversion, filtering, demodulation, and analog to digital conversion of received signals. The broadband Tx/Rx 156 may be operable to perform amplification, up-conversion, filtering, modulation, and digital to analog conversion of transmitted signals. The broadband Tx/Rx 156 may transmit and/or receive data over the broadband connection 157 which may comprise, for example, a T1/E1 line, optical fiber (e.g., XPON), DSL, cable television infrastructure, satellite broadband internet connection, satellite television infrastructure, and/or Ethernet. The broadband connection 157 may be similar to or the same as the broadband connections 120 described with respect to FIG. 1A.

The processor 158 may comprise suitable logic, circuitry, and/or code that may enable processing data and/or controlling operations of the IFSTB device 150. In this regard, the processor 158 may be enabled to provide control signals to the various other portions comprising the IFSTB device 150. The processor 158 may also control transfers of data between various portions of the IFSTB device 150. Additionally, the processor 158 may enable execution of applications programs and/or code. In various embodiments of the invention, the applications, programs, and/or code may enable, for example, parsing, transcoding, or otherwise processing data. In various embodiments of the invention, the applications, programs, and/or code may enable, for example, configuring or controlling operation of the GNSS Rx 170, cellular Tx/Rx 154, the broadband Tx/Rx 156, the DSP 162, and/or the memory 160.

The memory 160 may comprise suitable logic, circuitry, and/or code that may enable storage or programming of information comprising parameters and/or code that may effectuate the operation of the IFSTB device 150. The information may comprise received data and/or data to be presented, transmitted, and/or otherwise processed. The parameters may comprise configuration data and the code may comprise operational code such as software and/or firmware, but the information need not be limited in this regard. Moreover, the parameters may include adaptive filter and/or block coefficients.

The DSP 162 may comprise suitable logic, circuitry, and/or code operable to perform computationally intensive processing of data. In various embodiments of the invention, the DSP 162 may encode, decode, transcode, modulate, demodulate, encrypt, decrypt, scramble, descramble, and/or otherwise process data. In various embodiments of the invention, the DSP 162 may be enabled adjust a modulation scheme, error coding scheme, and/or data rates of transmitted cellular signals data.

The multimedia interface 164 may comprise suitable logic, circuitry, and/or code that may be operable to communicate multimedia content to one or more devices for presentation to a user. In this regard, multimedia content may be received via one or more of the cellular Tx/Rx 154, the broadband Tx/Rx 156, and/or the I/O interface 166. For example, the multimedia interface 164 may output analog and/or digital multimedia signals such as analog audio, composite video, analog RGB video, S-Video, component video, DVI, HDMI, and/or DisplayPort. In this regard, the multimedia interface 164 may be operable to up-convert, filter, modulate, and/or amplify multimedia signals. Accordingly, the multimedia connection(s) 165 may comprise one or more multimedia links suitable for conveying one or more of the multimedia standards supported by the multimedia interface 164.

The I/O interface 166 may comprise suitable logic, circuitry, and/or code that may be operable to exchange information in accordance with one or more communication standards. Exemplary communication standards supported by the I/O interface 166 may comprise USB, IEEE 1394, Wi-Fi, Wi-Max, infrared (IR), and/or Bluetooth. Accordingly, the I/O connection(s) 167 may comprise one or more optical, wired and/or wireless links suitable for conveying one or more of the communication standards supported by the I/O interface 166.

In operation, the IFSTB device 150 may be enabled to transmit and/or receive data via cellular communications, transmit and/or receive data over the broadband connection 157, transmit and/or receive data via the multimedia interface 164, transmit and/or receive data via the I/O interface 166, and transcode or otherwise process data for conveyance between two or more of the cellular Tx/Rx 154, the broadband Tx/Rx 156, the multimedia interface 164, and the I/O interface 166. In this regard, the IFSTB device 150 may receive a data stream formatted for transmission in adherence to a first set of standards or protocols and transcode the received data stream to generate a corresponding data stream that adheres to a second set of standards or protocols. For example, the IFSTB device 150 may transcode a data stream formatted in accordance with cellular standards or protocols to a corresponding data stream formatted in accordance with one or more standards and/or protocols such as HDMI protocols.

In various embodiments of the invention, the various portions of the IFSTB device 150 may operate on and/or be synchronized to the clock 172. In this manner, transferring data between portions of the IFSTB device 150; transmitting data via the cellular Tx/Rx 154 and/or the broadband Tx/Rx 156; and/or decoding, transcoding, presenting, or otherwise processing data in the DSP 162, cellular Tx/Rx 154 and/or the broadband Tx/Rx 156 may be synchronized to the clock 172.

In various embodiments of the invention, data received via the cellular Tx/Rx 154, the broadband Tx/Rx 156, the multimedia interface 164, and/or the I/O interface 166 may comprise control data which may be utilized to control operations and/or functionality of the femtocell 150. In this regard, the STB-FC may be controlled remotely from, for example, a cellular enabled communication device communication device or a PC.

Figure 2:
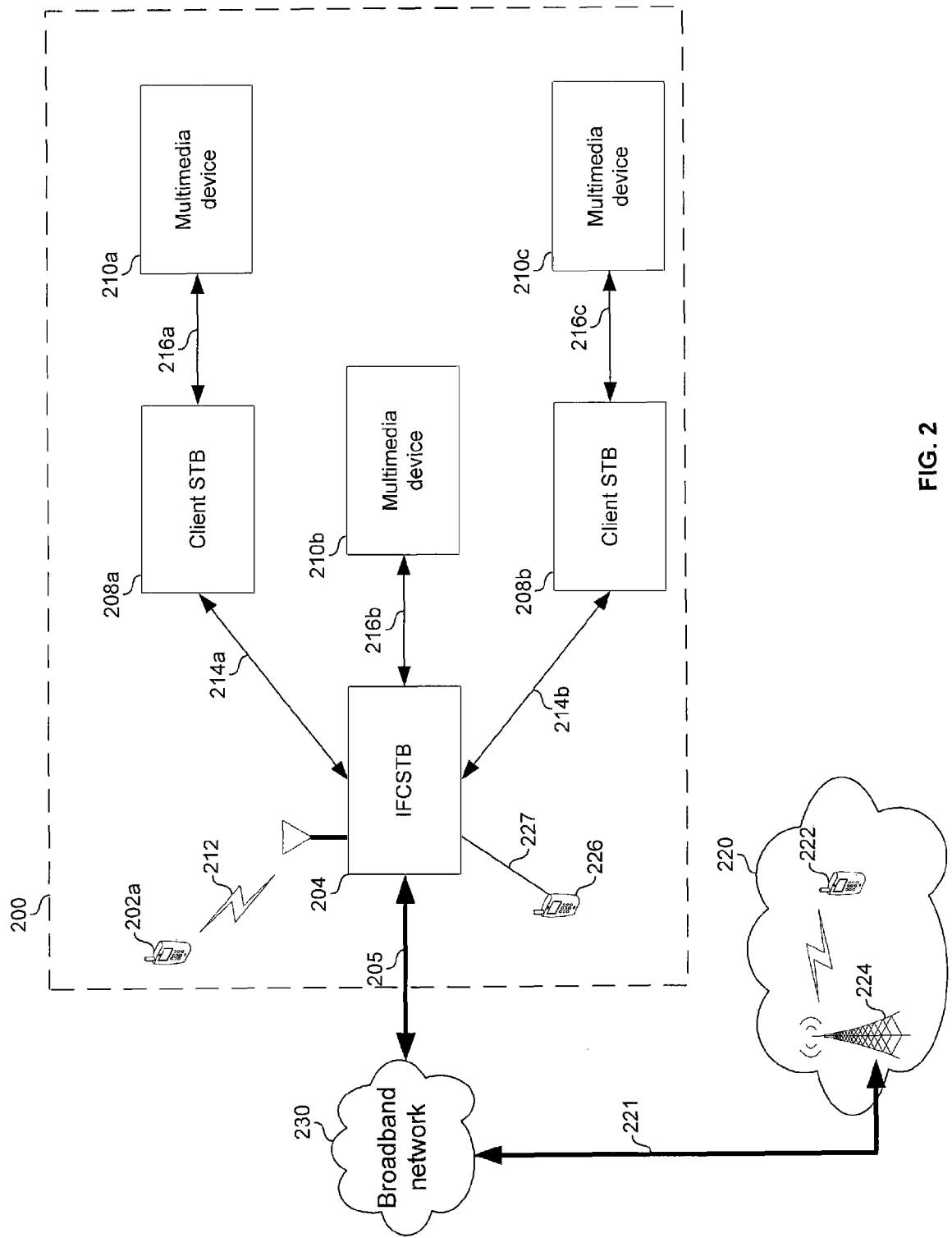
FIG. 2 is a diagram of a multimedia network comprising integrated femtocell and set-top-box (IFSTB) device, in accordance with an embodiment of the invention.

FIG. 2 is a diagram of a multimedia network comprising an integrated femtocell and set-top-box (IFSTB) device, in accordance with an embodiment of the invention. Referring to FIG. 2, the multimedia network 200 may comprise a cellular enabled communication device communication device 202, portable device 226, a IFSTB device 204, client set-top-boxes (STBs) 208a and 208b, which are collectively referred to herein as clients STBs 208, and multimedia devices 210a, 210b, and 210c, which are collectively referred to herein as multimedia devices 210. The IFSTB device 204 may be communicatively coupled, via broadband connection 205, to a network 230, which may in turn be communicatively coupled, via cellular connection 221, to a cellular network 220. In various embodiments of the invention, the network 230 may comprise a network, such as a cable television network, satellite television network, or the Internet, enabled to convey general data and/or multimedia. The IFSTB device 204 may be communicatively coupled to one or more client set-top-boxes (STBs) 208 via multimedia connections 214. The IFSTB device 204 may be communicatively coupled to one or more multimedia devices 210 via multimedia connections 216. The multimedia connections 214 and 216 may be similar to or the same as the multimedia connections 165 described with respect to FIG. 1B. The IFSTB device 204 may be communicatively coupled to one or more portable devices 226 via I/O connections 227 which may be similar to or the same as the I.O connection 167 described with respect to FIG. 1B.

The cellular network 220 may be similar to or the same as the cellular network 100 described with respect to FIG. 1A. The network 230 may be similar to or the same as the networks 122 described with respect to FIG. 1A.

The portable device 226 may comprise, for example, a cellular enabled communication device communication device, a laptop computer, a personal data assistant, or a personal media player. The I/O connection 227 to the portable device 226 may comprise, for example, a Ethernet, USB, or IEEE 1394 connection.

The cellular enabled communication device communication device 202 may be similar to or the same as the cellular enabled communication devices 112 described with respect to FIG. 1A. In various embodiments of the invention, the cellular enabled communication device communication device 202 may store and/or be associated with a user profile for the multimedia network 200. The user profile may comprise information such as active subscriptions, parental settings, and/or personal preferences. Also, the user profile may comprise security information such as certificates, passwords, and/or encryption keys. In this regard, permissions, features, and/or functionality of the cellular enabled communication device communication device and/or one or more other communication devices 112 may be based on a user profile and the security information associated with the user profile may enable viewing and/or otherwise accessing multimedia content. Thus, the user profile may be delivered to and/or configured on the cellular enabled communication device communication device 202 via cellular communications with, for example, a base station such as the base station 224.

The backhaul connection 221 may convey data between the cellular network 220 and the network 230. In this regard, the backhaul connection 221 may comprise one or more optical, wired, and/or wireless backhaul links which communicatively couple the base station 224 to the network 230.

The broadband connection 205 may comprise one or more high bandwidth links that may be enabled to convey data. Exemplary broadband connections may comprise an Ethernet connection, a digital subscriber line (DSL), passive optical network, a T1/E1 line, a cable television infrastructure, a satellite television infrastructure, and/or a satellite broadband Internet connection. The broadband connection 205 may comprise one or more optical, wired and/or wireless links. The connection 205 may be similar to or the same as the connections 120 described with respect to FIG. 1A.

The integrated femtocell and set-top-box (IFSTB) device 204 may comprise suitable logic, circuitry, and/or code that may be operable to receive data, transcode data, output data for presentation, store data, and/or transmit the data via one or more interfaces and/or protocols. The IFSTB device 204 may be operable to transmit and/or receive data via cellular communication. The IFSTB device 204 may be operable to transmit and/or receive data via the broadband connection 205. In some embodiments of the invention, IFSTB device 204 may be operable to output multimedia to one or more multimedia devices 210. The IFSTB device 204 may be operable to output processed, stored, and/or received data to one or more client STBs 208.

In some embodiments of the invention, the permissions, features, and/or functionality of the IFSTB device 204, and thus services (e.g., Internet access) and/or multimedia content available to the network 200, may be configurable and may be determined based on one or more user profiles. Accordingly, a first set of services and/or multimedia content may be available to the network 200 for a first user profile and a second set of services and/or multimedia content may be available for a second user profile. The first user profile may be similar to or different from the second user profile. The profile may be persistent and may only need to be periodically updated. Alternatively, the user profile may only be valid while an associated or particular device is communicatively coupled to, or within range of, the IFSTB device 204. For example, a user profile may be stored on and/or associated with a cellular enabled communication device communication device. In an exemplary embodiment of the invention, an electronic programming guide (EPG) may be customized and delivered to a cellular enabled communication device based on a user profile associated with that cellular enabled communication device device. For example, channels, stations, and/or content in the EPG communicated to a cellular enabled communication device may be customized to the capabilities and/or preferences of that device. Additionally and/or alternatively, favorite channels, stations, and/or content associated with a user profile may be communicated by default and/or before non-favorite channels, stations, and/or content.

The client STBs 208 may each comprise suitable logic, circuitry, and/or code that may be operable to receive multimedia content, process the multimedia content if necessary, and output the multimedia content to one or more multimedia devices 210. In some embodiments of the invention, the permissions, features, and/or functionality of the client STBs 208 may be configurable. In this manner, multimedia content that may be processed and/or presented by the client STBs 208 may be determined based on one or more user profiles. In some embodiments of the invention, the client STBs 208 may be physically the same as the IFSTB device 204 but may be configured differently than the IFSTB device 204 based, at least in part, on one or more user profiles. In some embodiments of the invention, one or more of the client STBs may comprise or may be communicatively coupled to a cellular enabled communication device communication device. For example, the may be coupled via a USB or IEEE 1394 connection to a cellular phone or broadband access card.

The multimedia devices 210 may comprise, for example, televisions, displays, stereo systems, and/or recording and/or playback devices. The multimedia devices 210 may be enabled to receive multimedia video content and present the content to a user. Additionally, the multimedia devices 210 may be enabled to store, playback, and/or retrieve from memory, data to be communicated to another device. In this regard, the data may be conveyed to the IFSTB device 204 for processing and/or conveyance to another device of the network 200 and/or via the broadband connection 205.

In operation, the cellular enabled communication device communication device 202 may enter cellular communication range of the IFSTB device 204. Subsequently, the cellular enabled communication device communication device 202 may communicate its user profile to the IFSTB device 204 via a cellular communication channel 212. In this manner, the user profile may be delivered to and/or verified by the network 200 via a communication channel that is out-of-band with the broadband connection 205. Accordingly, security of the content and/or services may be improved over conventional multimedia networks since the user profile may be delivered or handled separate from the content and/or services that the user profile controls. Upon receipt and/or verification of the user profile by the IFSTB device 204, the IFSTB device 204 and/or the client STBs 208 may be configured based on the user profile.

Subsequent to configuration of the network 200, the IFSTB device 204 may begin transcoding or otherwise processing data received via one or more of the broadband connection 205, the cellular communication channel 212, the multimedia connection(s) 214 and/or the multimedia connection(s) 216. Received data may be forwarded and/or processed data communicated to the cellular enabled communication device communication device 202 via the cellular channel(s) 212, to the client STB 208a and/or 208b via the multimedia connection(s) 214a and/or 214b, and/or to the multimedia device 210 via the multimedia connection 216b.

In some embodiments of the invention, the IFSTB device 204 may be controlled remotely via data received over the network 230 and/or via a cellular communication channel such as the channel 212. For example, the cellular enabled communication device communication device 222 may request an operation be performed by the network 200 by sending data to the IFSTB device 204 via the base station 224, the backhaul connection 221, the network 230, and the broadband connection 205. In some embodiments of the invention, the IFSTB device 204 may be controlled remotely by a wireless communication device utilizing cellular and/or other wireless protocol such as Bluetooth, wireless USB, UWB, communications at or near 60 GHz such as defined by IEEE 802.15.3, and/or ZigBee. The IFSTB device 204 may also be controlled locally by a wired connection such as the I/O connection 227 to the portable device 226. For example, the cellular enabled communication device communication device 202 may effectively operate as a remote control of the IFSTB device 204.

Figure 3:
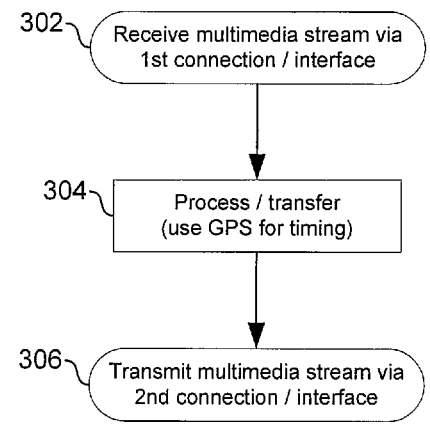
FIG. 3 is a flow chart illustrating exemplary steps for data delivery and presentation via an integrated femtocell and set-top-box (IFSTB) device, in accordance with an embodiment of the invention.

FIG. 3 is a flow chart illustrating exemplary steps for data delivery and presentation via an integrated femtocell and set-top-box (IFSTB) device, in accordance with an embodiment of the invention. Referring to FIG. 3, the exemplary steps may begin with step 302 when the IFSTB device 150 receives multimedia via a first interface. In this regard, the data may be received via the cellular Tx/Rx 154, the broadband Tx/Rx 156, the multimedia interface 164, or the I/O interface 166. The received data may be recovered from a packetized data stream and may be buffered in the memory 160. Subsequent to step 302, the exemplary steps may advance to step 304.

In step 304, the received multimedia may be decoded, transcoded to another standard or communication protocol, or otherwise processed based on a destination of the data. For example, in instances that the data is to be output via the multimedia interface 164, the multimedia may be decoded and rendered for presentation. Alternatively, the multimedia may be encoded or transcoded to a format suitable for transmission via the cellular Tx/Rx and/or the broadband Tx/Rx 156. In various embodiments of the invention, since the multimedia content may be time sensitive, decoding, presenting, and/or otherwise processing the data may be synchronized, or performed with reference to, the time maintained by the clock 172. Similarly, the transference of data between various portions of the IFSTB device 150 may be synchronized to the clock 172. Subsequent to step 304, the exemplary steps may advance to step 306.

In step 306, the processed data may be output or transmitted via one or more of the cellular Tx/Rx 154, the broadband Tx/Rx 156, the multimedia interface 164, or the I/O interface 166. In various embodiments of the invention, timing of the transmissions and timestamps and/or other timing information pertaining to transmitted data streams may be based on the clock 172.

Exemplary aspects of a method and system for data processing in a device with integrated set-top-box and femtocell functionality are provided. In an exemplary embodiment of the invention, data may be received via an integrated femtocell and set-top-box device 150 (FIG. 1B) and may be synchronously processed, utilizing a common clock 172 (FIG. 1B), to perform one or more femtocell functions and/or set-top-box functions. A portion of the femtocell functions may be implemented via a cellular transmitter and/or receiver 154 (FIG. 1B) within the integrated femtocell and set-top-box device. A portion of the set-top-box functions may be implemented via a broadband transmitter and/or receiver 156 (FIG. 1B) within the integrated femtocell and set-top-box device 150. A portion of the set-top-box functions may be implemented via one or more multimedia interfaces 164 (FIG. 1B) within the integrated femtocell and set-top-box device 150. The common clock 172 may be derived from global navigation satellite system signals. The integrated femtocell and set-top-box device 150 may convert the received data from a first to a second format. The converted data may be transmitted to a cellular enabled communication device device 202 via the cellular transmitter and/or receiver 154 and/or to one or more multimedia devices 216 via the multimedia interface 164 (FIG. 1B). The received data may comprise multimedia content. The integrated femtocell and set-top-box device 150 may be operable to encode, decode, transcode, encrypt, decrypt, scramble, descramble, and present the received data. The integrated femtocell and set-top-box device 150 may be operable to receive the data via the cellular transmitter and/or receiver 154, transcode the data, and transmit the transcoded data via the multimedia interface 164. The integrated femtocell and set-top-box device 150 may be operable to receive the data via the multimedia interface 164, transcode the data, and transmit the transcoded data via the cellular transmitter and/or receiver.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for data processing in a device with integrated set-top-box and femtocell functionality.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:
1. A method for networking comprising:
receiving user profile information and first data according to a first cellular standard in a single integrated femtocell and set-top-box device;
receiving, within the single integrated femtocell and set-top-box device, a navigation signal;
generating, within the single integrated femtocell and set-top-box device, a common clock signal based on the navigation signal;

generating, using the common clock signal, second data from the first data based on the user profile information, wherein the second data is formatted according to a second cellular standard, and transmitting, using the common clock signal, the second data via a multimedia interface.

2. The method according to claim 1, wherein the navigation signal is a global navigation satellite system (GNSS) signal.

3. The method according to claim 1, further comprising:
processing, based on the user profile information, the first data for performing one or more femtocell functions and/or set-top-box functions within the single integrated femtocell and set-top-box device utilizing the common clock signal.

4. The method according to claim 3, wherein the transmitting includes transmitting the second data to a cellular enabled communication device.

5. The method according to claim 1, wherein the transmitting includes transmitting the second data to one or more multimedia devices.

6. The method according to claim 1, further comprising:
encoding, decoding, transcoding, encrypting, decrypting, scrambling, descrambling, and/or presenting the first data with the single integrated femtocell and set-top-box device.

7. The method according to claim 1, further comprising:
transcoding the first data.

8. A system for data processing, the system comprising:
one or more circuits for use in a single integrated femtocell and set-top-box device, wherein the one or more circuits are configured to:
receive user profile information and first data according to a first cellular standard,
receive a navigation signal,
generate a common clock signal based on the navigation signal,
generate, using the common clock signal, second data from the first data based on the user profile information wherein the second data is formatted according to a second cellular standard, and
transmit, using the common clock signal, the second data via a multimedia interface.

9. The system according to claim 8, wherein the navigation signal is a global navigation satellite system (GNSS) signal.

10. The system according to claim 8, wherein the one or more circuits are further configured to:
process, based on the user profile information, the first data for performing one or more femtocell functions and/or set-top-box functions within the single integrated femtocell and set-top-box device utilizing the common clock signal.

11. The system according to claim 8, wherein the one or more circuits are further configured to transmit the second data to a cellular enabled communication device.

12. The system according to claim 8, wherein the one or more circuits are further configured to transmit the second data to one or more multimedia devices.

13. The system according to claim 8, wherein the one or more circuits are further configured to:
encode, decode, transcode, encrypt, decrypt, scramble, descramble, and/or present the first data.

14. The system according to claim 8, wherein the one or more circuits are further configured to:
transcode the first data.

15. The system of claim 8, wherein the one or more circuits comprise:
a first transceiver synchronized to the common clock signal, wherein the first transceiver is configured to receive the user profile information and the first data.

16. The system of claim 15, wherein the one or more circuits further comprise:
a second transceiver synchronized to the common clock signal, wherein the second transceiver is configured to transmit the second data.

17. A device with integrated set-top-box and femtocell functionality, the device comprising:
a first transceiver, synchronized to a clock signal generated within the device, configured to:
receive user profile information, and
receive first data formatted according to a cellular standard;
a processor, synchronized to the clock signal, configured to:
generate, based on the user profile information, second data from the first data, wherein the second data is formatted according to a second cellular standard; and
a second transceiver, synchronized to the clock signal, configured to:
transmit the second data via a multimedia interface.

18. The device of claim 17, further comprising:
a global navigation satellite system (GNSS) receiver configured to maintain an accuracy of the clock signal based on a received GNSS signal.

19. The device of claim 17, further comprising:
a digital signal processor synchronized to the clock signal; and
an input/output interface synchronized to the clock signal.

20. The device of claim 17, wherein the first transceiver is further configured to:
transmit the second data via a cellular communication channel.

21. The device of claim 17, wherein the processor is further configured to:
configure the device based on the user profile information.

22. The device of claim 17, wherein the user profile information is verified prior to being received by the first transceiver.

23. The device of claim 17, wherein the second data is first multimedia content if the device has been configured based on a first user profile, wherein the second data is second multimedia content if the device has been configured based on a second user profile, and wherein the first multimedia content is different from the second multimedia content.

24. The device of claim 17, wherein the first transceiver is further configured to perform a femtocell function for the device, and wherein the first transceiver is:
a broadband transceiver; or
a cellular transceiver.

25. A device with integrated set-top-box and femtocell functionality, the device comprising:
a receiver configured to:
receive a signal, and
generate a clock signal based on the signal;
a cellular transceiver synchronized to the clock signal;
a broadband transceiver synchronized to the clock signal;
a processor, synchronized to the clock signal, configured to:
generate, based on first user profile information, first multimedia content from first data, wherein the first data is received from the cellular transceiver or the broadband transceiver, wherein the first user profile information is received from the cellular transceiver or the broadband transceiver, wherein the first data is formatted according to a first standard, and wherein the first multimedia content is formatted according to a second standard; and a multimedia interface, synchronized to the clock signal, configured to:

transmit the first multimedia content, wherein the first multimedia content is different from second multimedia content corresponding to second user profile information.

* * * * *